United States Patent
Dai et al.

(10) Patent No.: US 10,996,449 B2
(45) Date of Patent: May 4, 2021

(54) OPTICAL IMAGING SYSTEM

(71) Applicant: Zhejiang Sunny Optical Co., Ltd, Ningbo (CN)

(72) Inventors: Fujian Dai, Ningbo (CN); Jianke Wenren, Ningbo (CN); Jian Yang, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 276 days.

(21) Appl. No.: 16/273,940

(22) Filed: Feb. 12, 2019

(65) Prior Publication Data

US 2019/0187446 A1 Jun. 20, 2019

Related U.S. Application Data (63) Continuation of application No. PCT/CN2018/091834, filed on Jun. 19, 2018.

(30) Foreign Application Priority Data

Sep. 21, 2017 (CN) .......................... 201710859728.3
Sep. 21, 2017 (CN) .......................... 201721216307.0

(51) Int. Cl.
*G02B 17/08* (2006.01)
*G02B 13/00* (2006.01)

(52) U.S. Cl.
CPC ......... *G02B 17/086* (2013.01); *G02B 13/004* (2013.01); *G02B 13/0035* (2013.01); *G02B 13/0055* (2013.01); *G02B 17/0808* (2013.01)

(58) Field of Classification Search
CPC .............. G02B 17/086; G02B 13/0055; G02B 17/0808; G02B 13/0035; G02B 13/004
See application file for complete search history.

(56) References Cited

U.S. PATENT DOCUMENTS

| 2009/0201593 | A1 | 8/2009 | Isono | |
|---|---|---|---|---|
| 2010/0110565 | A1 | 5/2010 | Togino | |
| 2016/0187631 | A1* | 6/2016 | Choi | ........................ G02B 3/02 359/708 |

FOREIGN PATENT DOCUMENTS

| CN | 102621666 | 8/2012 |
|---|---|---|
| CN | 103309019 | 9/2013 |
| CN | 107065142 A | 8/2017 |

* cited by examiner

*Primary Examiner* — Wen Huang
(74) *Attorney, Agent, or Firm* — Hauptman Ham, LLP (57) ABSTRACT

The present disclosure discloses an optical imaging system including sequentially, from an object side to an image side along an optical axis, a first lens, a second lens, and at least one subsequent lens. The first lens may have: a first transmission surface disposed on an outer circumference of an object-side surface of the first lens; a first reflection surface disposed on an outer circumference of an image-side surface of the first lens; a second reflection surface disposed at a paraxial region of the object-side surface of the first lens; and a second transmission surface disposed at a paraxial region of the image-side surface of the first lens. A distance TTL from a center of the object-side surface of the first lens to an image plane of the optical imaging system on the optical axis and an effective focal length f of the optical imaging system may satisfy: TTL/f≤0.6.

7 Claims, 6 Drawing Sheets

OPTICAL IMAGING SYSTEM

CROSS-REFERENCE TO RELATED APPLICATIONS

This is a continuation of International Application PCT/CN2018/091834, with an international filing date of Jun. 19, 2018, which claims priorities and rights to Chinese Patent Application No. 201710859728.3 and Chinese Patent Application No. 201721216307.0, filed with the China National Intellectual Property Administration (CNIPA) on Sep. 21, 2017, the disclosures of which are hereby incorporated by reference in their entireties.

TECHNICAL FIELD

The present disclosure relates to an optical imaging system, and more specifically to an optical imaging system for a catadioptric optical path.

BACKGROUND

At present, photosensitive elements commonly used in optical systems include charge-coupled devices (CCD) and complementary metal-oxide semiconductor (CMOS) image sensors. With the improvement in performance and reduction in size of the elements, requirements for camera lens assemblies are also constantly increasing.

In order to match the photosensitive elements, the overall lengths of optical lens assemblies need to be further reduced to meet the requirements of miniaturization and lightweight. However, the current camera system equipped with a refractive optical system, a reflective optical system, and an imaging optical system cannot meet the requirement of miniaturization, and has difficulty in matching an imaging device that is becoming increasingly miniaturized.

Accordingly, the present disclosure is aimed to provide an optical imaging system with high performance, which meets the miniaturization requirement and can effectively improve aberrations.

SUMMARY

The technical solution provided by the present disclosure at least partially solves the technical problems described above.

According to an aspect, the present disclosure provides an optical imaging system. The optical imaging system includes sequentially, from an object side to an image side along an optical axis, a first lens, a second lens, and at least one subsequent lens. The first lens may have: a first transmission surface, disposed on an outer circumference of an object-side surface of the first lens; a first reflection surface, disposed on an outer circumference of an image-side surface of the first lens; a second reflection surface, disposed at a paraxial region of the object-side surface of the first lens; and a second transmission surface, disposed at a paraxial region of the image-side surface of the first lens. A distance TTL from a center of the object-side surface of the first lens of the optical imaging system to an image plane of the optical imaging system on the optical axis and an effective focal length f of the optical imaging system may satisfy: TTL/f≤0.6.

According to another aspect, the present disclosure further provides an optical imaging system. The optical imaging system includes sequentially, from an object side to an image side along an optical axis, a first lens, a second lens, and at least one subsequent lens. The first lens may have: a first transmission surface, disposed on an outer circumference of an object-side surface of the first lens; a first reflection surface, disposed on an outer circumference of an image-side surface of the first lens; a second reflection surface, disposed at a paraxial region of the object-side surface of the first lens; and a second transmission surface, disposed at a paraxial region of the image-side surface of the first lens. A maximum effective radius DT1 of the first lens and half of a diagonal length ImgH of an effective pixel area on an image plane of the optical imaging system satisfy: DT1/ImgH<2.0.

According to another aspect, the present disclosure further provides an optical imaging system. The optical imaging system includes sequentially, from an object side to an image side along an optical axis, a first lens, a second lens, and at least one subsequent lens. The first lens may have: a first transmission surface, disposed on an outer circumference of an object-side surface of the first lens; a first reflection surface, disposed on an outer circumference of an image-side surface of the first lens; a second reflection surface, disposed at a paraxial region of the object-side surface of the first lens; and a second transmission surface, disposed at a paraxial region of the image-side surface of the first lens. A maximum effective radius DT1 of the first lens may satisfy: DT1<4.5 mm.

According to another aspect, the present disclosure further provides an optical imaging system. The optical imaging system includes sequentially, from an object side to an image side along an optical axis, a first lens, a second lens, and at least one subsequent lens. The first lens may have: a first transmission surface, disposed on an outer circumference of an object-side surface of the first lens; a first reflection surface, disposed on an outer circumference of an image-side surface of the first lens; a second reflection surface, disposed at a paraxial region of the object-side surface of the first lens; and a second transmission surface, disposed at a paraxial region of the image-side surface of the first lens. It may satisfy: 0.1<BFL/TTL<0.2, here, BFL is a distance from an image-side surface of a lens closest to the image side of the optical imaging system to an image plane of the optical imaging system on the optical axis; and TTL is a distance from a center of the object-side surface of the first lens of the optical imaging system to the image plane of the optical imaging system on the optical axis.

According to another aspect, the present disclosure further provides an optical imaging system. The optical imaging system includes sequentially, from an object side to an image side along an optical axis, a first lens, a second lens, and at least one subsequent lens. The first lens may have: a first transmission surface, disposed on an outer circumference of an object-side surface of the first lens; a first reflection surface, disposed on an outer circumference of an image-side surface of the first lens; a second reflection surface, disposed at a paraxial region of the object-side surface of the first lens; and a second transmission surface, disposed at a paraxial region of the image-side surface of the first lens. The first reflection surface and the second reflection surface may have a total reflection effect.

In an implementation, a maximum effective radius DT1 of the first lens may satisfy: DT1<4.5 mm, for example, DT1≤3.5.

In an implementation, the maximum effective radius DT1 of the first lens and half of a diagonal length ImgH of an effective pixel area on an image plane of the optical imaging system may satisfy: DT1/ImgH<2.0, for example, DT1/ImgH≤1.3.

In an implementation, the maximum effective radius DT1 of the first lens and a maximum effective radius DT2 of the second transmission surface of the first lens may satisfy: 0<DT2/DT1≤0.5, for example, 0.3≤DT2/DT1≤0.48.

In an implementation, a distance TTL from a center of the object-side surface of the first lens of the optical imaging system to the image plane of the optical imaging system on the optical axis and an effective focal length f of the optical imaging system may satisfy: TTL/f≤0.6.

In an implementation, the effective focal length f of the optical imaging system and an entrance pupil diameter EPD of the optical imaging system may satisfy: f/EPD<2.8, for example, f/EPD≤2.6.

In an implementation, it may satisfy: 0.1<BFL/TTL<0.2, for example, 0.12≤BFL/TTL≤0.18. Here, BFL is a distance from an image-side surface of a lens closest to the image side of the optical imaging system to the image plane of the optical imaging system on the optical axis; and TTL is the distance from the center of the object-side surface of the first lens of the optical imaging system to the image plane of the optical imaging system on the optical axis.

In an implementation, the first reflection surface and the second reflection surface may have a total reflection effect.

The optical imaging system with the above configuration may further have at least one advantageous effect of miniaturization, high performance, high imaging quality, high resolution, balanced aberration, or the like.

BRIEF DESCRIPTION OF THE DRAWINGS

The above and other advantages of implementations of the present disclosure will become apparent from the detailed description with reference to the following accompanying drawings. The accompanying drawings are intended to illustrate the exemplary implementations of the present disclosure rather than limiting them. In the accompanying drawings.

For a better understanding of the present disclosure, various aspects of the present disclosure will be described in more detail with reference to the accompanying drawings. It should be understood that the detailed description is merely an illustration of the exemplary implementations of the present disclosure rather than a limitation on the scope of the present disclosure in any way. Throughout the specification, the identical reference numerals designate the same elements. The expression "and/or" includes any and all combinations of one or more of the associated listed items.

It should be noted that in the specification, the expressions, such as "first," and "second" are only used to distinguish one feature from another, rather than represent any limitations to the features. Thus, the first lens discussed below may also be referred to as the second lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

It should be further understood that the terms "comprising," "including," "having" and variants thereof, when used in the specification, specify the presence of stated features, entireties, steps, operations, elements and/or components, but do not exclude the presence or addition of one or more other features, entireties, steps, operations, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

As used herein, the terms "substantially", "about", and similar terms are used as terms to represent approximations, and are not intended to be used as terms to represent degrees, and are intended to illustrate the inherent deviations in measured or calculated values that will be recognized by those of ordinary skills in the art.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, the paraxial area refers to an area near the optical axis. The first lens is the lens closest to the object. As used herein, the surface closest to the object in each lens is referred to as the object-side surface, and the surface closest to the image plane in each lens is referred to as the image-side surface.

It should also be noted that the embodiments in the present disclosure and the features in the embodiments may be combined with each other on a non-conflict basis. The present disclosure will be described below in detail with reference to the accompanying drawings and in combination with the embodiments.

The present disclosure is further described below in combination with the specific embodiments.

An optical imaging system according to the exemplary embodiments of the present disclosure may have at least three lenses. For example, in an exemplary embodiment, the optical imaging system may include a first lens, a second lens, a third lens, and a fourth lens. In another exemplary embodiment, the optical imaging system may include a first lens, a second lens, and a third lens. The at least three lenses are sequentially arranged from an object side to an image side alone; an optical axis.

In an exemplary implementation, the first lens in the optical imaging system may have a first transmission surface disposed on an outer circumference of an object-side surface of the first lens; a first reflection surface disposed on an outer circumference of an image-side surface of the first lens; a second reflection surface disposed at a paraxial region of the object-side surface of the first lens; and a second transmission surface disposed at a paraxial region of the image-side surface of the first lens. By configuring a catadioptric optical path for the optical system, the total length of the optical system may be effectively reduced, and a system spherical aberration introduced may be minimized, thereby improving the system performance.

In an exemplary implementation, a maximum effective radius DT1 of the first lens may satisfy: DT1<4.5 mm, and more specifically, may further satisfy: DT1≤3.5. With such a configuration, the aperture of the optical system may be reduced to meet the miniaturization requirement.

In an exemplary implementation, the maximum effective radius DT1 of the first lens and half of a diagonal length ImgH of an effective pixel area on an image plane of the optical imaging system may satisfy: DT1/ImgH<2.0, and more specifically, may further satisfy: DT1/ImgH≤1.3. With such a configuration, the system resolution may be improved as much as possible while satisfying miniaturization of the aperture.

In an exemplary implementation, the maximum effective radius DT1 of the first lens and a maximum effective radius DT2 of the second transmission surface of the first lens may satisfy: 0<DT2/DT1≤0.5, and more specifically, may further satisfy: 0.3≤DT2/DT1≤0.48. With such a configuration, the diffraction limit of the optical system may be effectively improved, thereby improving the system performance.

In an exemplary implementation, a distance TTL from a center of the object-side surface of the first lens of the optical imaging system to the image plane of the optical imaging system on the optical axis and an effective focal length f of the optical imaging system may satisfy: TTL/f≤0.6, and more specifically, may further satisfy: TTL/f≤0.5. With such a configuration, miniaturization of the optical system may be achieved.

In an exemplary implementation, the effective focal length f of the optical imaging system and an entrance pupil diameter EPD of the optical imaging system may satisfy: f/EPD<2.8, and more specifically, may further satisfy: f/EPD≤2.6. With such a configuration, the amount of light passing through the optical system may be ensured, thereby improving the diffraction limit of the system.

In an implementation, the optical system may satisfy: 0.1<BFL/TTL<0.2, and more specifically, may further satisfy: 0.125≤BFL/TTL≤0.18. Here, BFL is a distance from an image-side surface of a lens closest to the image side of the optical imaging system to the image plane of the optical imaging system on the optical axis; and TTL is the distance from the center of the object-side surface of the first lens of the optical imaging system to the image plane of the optical imaging system on the optical axis. With such a configuration, the value range of the back focus of the optical system may be ensured to meet the miniaturization requirement of the system, and at the same time meet the requirements for the actual production and assembly of the system.

In an implementation, the first reflection surface and the second reflection surface may have a total reflection effect. By properly selecting the refractive index range of the lens, the generation of aberrations may be reduced, thereby effectively improving the performance of the optical system.

In exemplary implementations, the optical imaging system may also be provided with a diaphragm STO for limiting the light beam, adjusting the amount of incoming light, and improving the imaging quality. The optical imaging system according to the above implementations of the present disclosure may use multiple lenses, for example, three lenses, four lenses as described above. By introducing the catadioptric optical path, and reasonably distributing the refractive power of each lens, the surface type of each lens, the center thickness of each lens, the spacing distances between the lenses on the axis, etc., the miniaturization of the lens assembly may be ensured, the aberrations may be improved, and the imaging quality may be improved, making the optical imaging system more conducive to production and processing and applicable to portable electronic products.

In the implementations of the present disclosure, at least one of the surfaces of the each lens is an aspheric surface. The aspheric lens is characterized in that its curvature continuously changes from the center of the lens to the periphery. In contrast to a spherical lens having a constant curvature from the center of the lens to the periphery, the aspheric lens has a better radius-of-curvature characteristic, has advantages of improving a distortion aberration and an astigmatic aberration, and can make the field of view larger and more realistic. The use of the aspheric lens can eliminate as much as possible the aberrations that occur during the imaging, thereby improving the imaging quality. In addition, the use of the aspheric lens may also effectively reduce the number of lenses in the optical system.

However, it should be understood by those skilled in the art that the various results and advantages described in the present specification may be obtained by changing the number of the lenses constituting the lens assembly without departing from the technical solution claimed by the present disclosure. For example, the optical imaging system may also include other numbers of lenses.

Specific embodiments of the optical imaging system that may be applied to the above implementations are further described below with reference to the accompanying drawings.

Embodiment 1

An optical imaging system according to Embodiment 1 of the present disclosure is described below with reference to FIGS. 1-2C.

Figure 1:
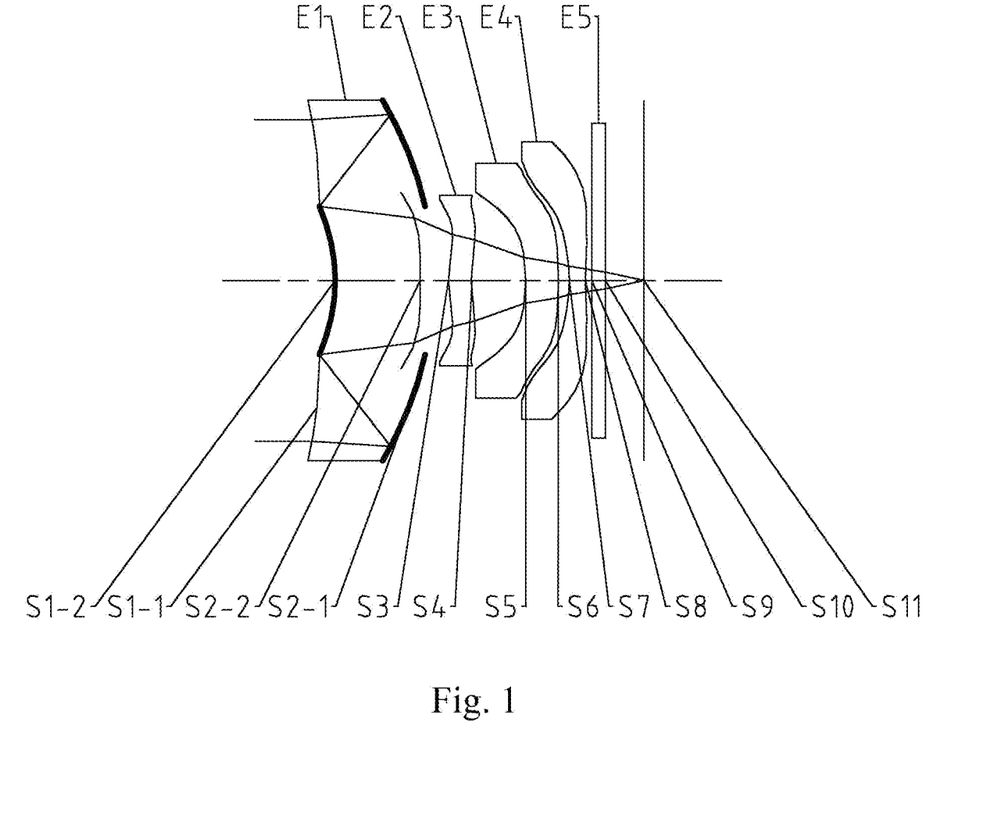
FIG. 1 is a schematic structural diagram illustrating an optical imaging system according to Embodiment 1 of the present disclosure.

FIG. 1 is a schematic structural diagram illustrating an optical imaging system according to Embodiment 1 of the present disclosure. As shown in FIG. 1, the optical imaging system includes four lenses E1-E4 arranged in sequence from an object side to an image side along an optical axis.

The first lens E1 has a first transmission surface S1-1, a first reflection surface S2-1, a second reflection surface S1-2, and a second transmission surface S2-2. The first transmission surface S1-1 is disposed on an outer circumference of an object-side surface of the first lens E1. The first reflection surface S2-1 is disposed on an outer circumference of an image-side surface of the first lens E1. The second reflection surface S1-2 is disposed at a paraxial region of the object-side surface of the first lens E1. The second transmission surface S2-2 is disposed at a paraxial region of the image-side surface of the first lens E1.

The second lens E2 has an object-side surface S3 and an image-side surface S4.

The third lens E3 has an object-side surface S5 and an image-side surface S6.

The fourth lens E4 has an object-side surface S7 and an image-side surface S8.

In this embodiment, the first lens E1 has a positive refractive power; the second lens E2 has a positive refractive power; the third lens E3 has a negative refractive power; and the fourth lens E4 has a negative refractive power.

In the optical imaging system of the present embodiment, a diaphragm STO disposed between the object side and the first lens for limiting the light beam is further included.

The optical imaging system according to Embodiment 1 may include an optical filter E5 having an object-side surface S9 and an image-side surface S10 and/or a protective lens E5'. The optical filter E5 may be used to correct the color deviation, and the protective lens E5' may be used to protect an image sensing chip located on an image plane S11. Light from an object sequentially passes through the surfaces S1-1 to S10 and finally forms an image on the image plane S11.

Table 1 below shows the surface type, the radius of curvature, the thickness, the material and the conic coefficient of each lens of the optical imaging system in Embodiment 1.

TABLE 1

| surface number | surface type | radius of curvature | thickness | material refractive index | abbe number | conic coefficient |
|---|---|---|---|---|---|---|
| OBJ | spherical | infinite | infinite | | | |
| S1-1 | aspheric | 37.5778 | 1.7724 | 1.55 | 56.1 | 0.0000 |
| S2-1 | aspheric | −5.3770 | −1.5224 | 1.55 | 56.1 | 0.0000 |
| S1-2(STO) | aspheric | −2.6565 | 1.3224 | 1.55 | 56.1 | −5.1496 |
| S2-2 | aspheric | 39.2423 | 0.4373 | | | 0.0000 |
| S3 | aspheric | −8.0694 | 0.3541 | 1.67 | 20.4 | 0.0000 |
| S4 | aspheric | 2.5592 | 0.8479 | | | 0.0000 |
| S5 | aspheric | −3.1901 | 0.5107 | 1.55 | 56.1 | 0.0000 |
| S6 | aspheric | −4.9267 | 0.1681 | | | 0.0000 |
| S7 | aspheric | −2.2257 | 0.2495 | 1.55 | 56.1 | 0.0000 |
| S8 | aspheric | 5.3674 | 0.1000 | | | 0.0000 |
| S9 | spherical | infinite | 0.2100 | 1.52 | 64.2 | 0.0000 |
| S10 | spherical | infinite | 0.5976 | | | 0.0000 |
| S11 | spherical | infinite | | | | |

In the present embodiment, four lenses are used as an example. By properly distributing the focal length and the surface type of each lens, the total length of the lens assembly is effectively shortened, ensuring miniaturization of the lens assembly; at the same time, various aberrations are corrected, and the resolution and imaging quality of the lens assembly are improved. The surface type x of each aspheric surface is defined by the following formula:

$$x = \frac{ch^2}{1 + \sqrt{1 - (k+1)c^2h^2}} + \Sigma A_i h^i \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 1 above); and Ai is the correction coefficient of the $i^{th}$ order of the aspheric surface. Table 2 below shows the high-order coefficients $A_4, A_6, A_8, A_{10}, A_{12}, A_{14}, A_{16}$ and $A_{18}$ applicable to the surfaces S1-1 to S8 in Embodiment 1.

TABLE 2

| surface number | A4 | A6 | A8 | A10 |
|---|---|---|---|---|
| S1-1 | −2.3824E−01 | 1.4353E−02 | 6.8430E−04 | 6.4109E−05 |
| S2-1 | −5.2400E−03 | 5.7687E−03 | 1.5330E−04 | 4.2863E−05 |
| S1-2 | −3.0443E−02 | 2.6099E−03 | −3.1578E−04 | 2.0871E−05 |

TABLE 2-continued

| | | | | |
|---|---|---|---|---|
| S2-2 | −2.9897E−01 | 2.0469E−02 | −2.8048E−03 | 6.1869E−04 |
| S3 | 3.1293E−01 | 6.9919E−02 | −2.3275E−02 | −1.4469E−03 |
| S4 | −1.1068E−01 | −1.5669E−01 | 1.4653E−01 | −5.7398E−02 |
| S5 | −1.1207E−01 | −9.3491E−02 | 6.7062E−02 | −1.2024E−02 |
| S6 | −3.8914E−01 | 9.7372E−02 | 3.4014E−02 | −5.2216E−02 |
| S7 | 1.8100E−01 | 7.9782E−02 | 6.3035E−02 | −5.1069E−02 |
| S8 | −1.1711E+00 | 8.1521E−02 | −1.4241E−02 | 1.2572E−02 |

| surface number | A12 | A14 | A16 | A18 |
|---|---|---|---|---|
| S1-1 | −6.6553E−05 | 5.06893E−06 | 0 | 0 |
| S2-1 | −1.9662E−05 | 0 | 0 | 0 |
| S1-2 | −1.0493E−05 | 2.38555E−06 | 0 | 0 |
| S2-2 | −3.6499E−05 | 0 | 0 | 0 |
| S3 | 1.65 12E−03 | −0.000248928 | −5.3314E−05 | −1.4839E−05 |
| S4 | 1.3707E−02 | 0 | 0 | 0 |
| S5 | 0 | 0 | 0 | 0 |
| S6 | 2.5616E−05 | 0 | 0 | 0 |
| S7 | 8.8329E−05 | 0.004027896 | 0 | 0 |
| S8 | −1.7419E−03 | 0.003916624 | 0 | 0 |

Table 3 below shows the effective focal lengths f1-f4 of the lenses in Embodiment 1, the total effective focal length f of the optical imaging system, and the distance TTL from the second reflection surface S1-2 of the first lens E1 to the image plane S11 of the optical imaging system on the optical axis.

TABLE 3

| f1(mm) | 10.45 | f(mm) | 11.48 |
|---|---|---|---|
| f2(mm) | 11.11 | TTL(mm) | 5.05 |
| f3(mm) | −18.50 | | |
| f4(mm) | −2.85 | | |

According to Table 1 to Table 3, in this embodiment, the maximum effective radius DT1 of the first lens E1 satisfies: DT1=2.77 mm. The maximum effective radius DT1 of the first lens E1 and the half of the diagonal length ImgH of the effective pixel area on the image plane of the optical imaging system satisfy: DT1/ImgH=1.01. The maximum effective radius DT1 of the first lens E1 and the maximum effective radius DT2 of the second transmission surface S2-2 of the first lens E1 satisfy: DT2/DT1=0.48. The distance TTL from the center of the second reflection surface S1-2 of the first lens E1 of the optical imaging system to the image plane S11 of the optical imaging system on the optical axis and the effective focal length f of the optical imaging system satisfy: TTL/f=0.44. The effective focal length f of the optical imaging system and the entrance pupil diameter EPD of the optical imaging system satisfy: f/EPD=2.3. BFL/TTL=0.18 is satisfied, where BFL is the distance from the image-side surface S8 of the fourth lens E4 to the image plane S11 of the optical imaging system on the optical axis; and TTL is the distance from the center of the second reflection surface S1-2 of the first lens of the optical imaging system to the image plane S11 of the optical imaging system on the optical axis.

Figure 2A:
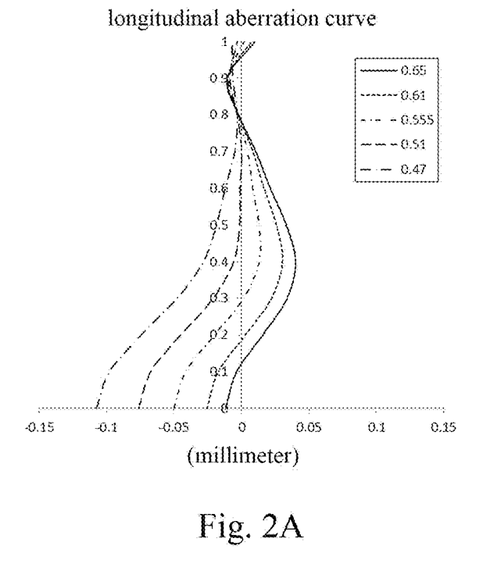
FIG. 2A illustrates a longitudinal aberration curve of the optical imaging system according to Embodiment 1.
Figure 2B:
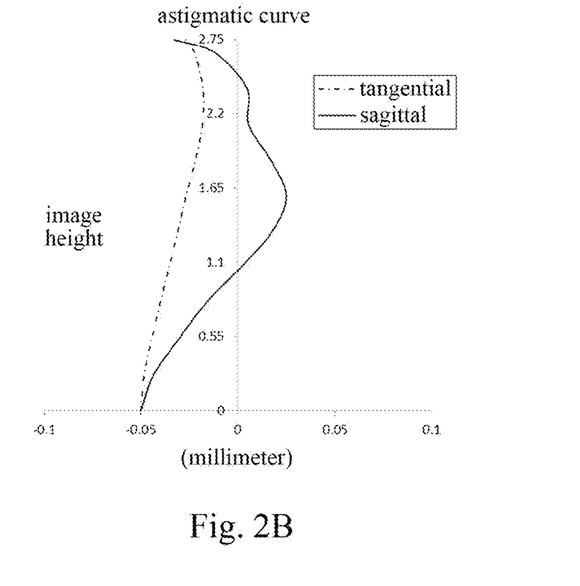
FIG. 2B illustrates an astigmatic curve of the optical imaging system according to Embodiment 1.
Figure 2C:
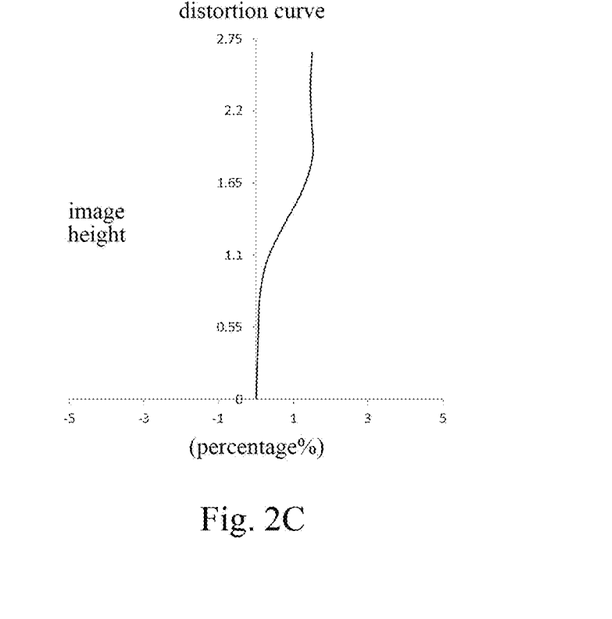
FIG. 2C illustrates a distortion curve of the optical imaging system according to Embodiment 1.

FIG. 2A illustrates the longitudinal aberration curve of the optical imaging system according to Embodiment 1, representing deviations of the focal points of the light of different wavelengths converged after passing through the optical imaging system. FIG. 2B illustrates the astigmatic curve of the optical imaging system according to Embodiment 1, representing a curvature of the tangential image plane and a curvature of the sagittal image plane. FIG. 2C illustrates the distortion curve of the optical imaging system according to Embodiment 1, representing amounts of distortion at different viewing angles. It can be seen from FIGS. 2A-2C that the optical imaging system according to Embodiment 1 can achieve a good imaging quality.

Embodiment 2

An optical imaging system according to Embodiment 2 of the present disclosure is described below with reference to FIGS. 3-4C. Except for the parameters of the lenses of the optical imaging system, for example, except for the radius of curvature, the thickness, the conic coefficient, the effective focal length, the on-axis spacing of each lens, and the high-order coefficient of each surface, the optical imaging system described in the present Embodiment 2 and the following embodiments is the same in layout structure as the optical imaging system described in Embodiment 1. For the purpose of brevity, the description of parts similar to those in Embodiment 1 will be omitted.

Figure 3:
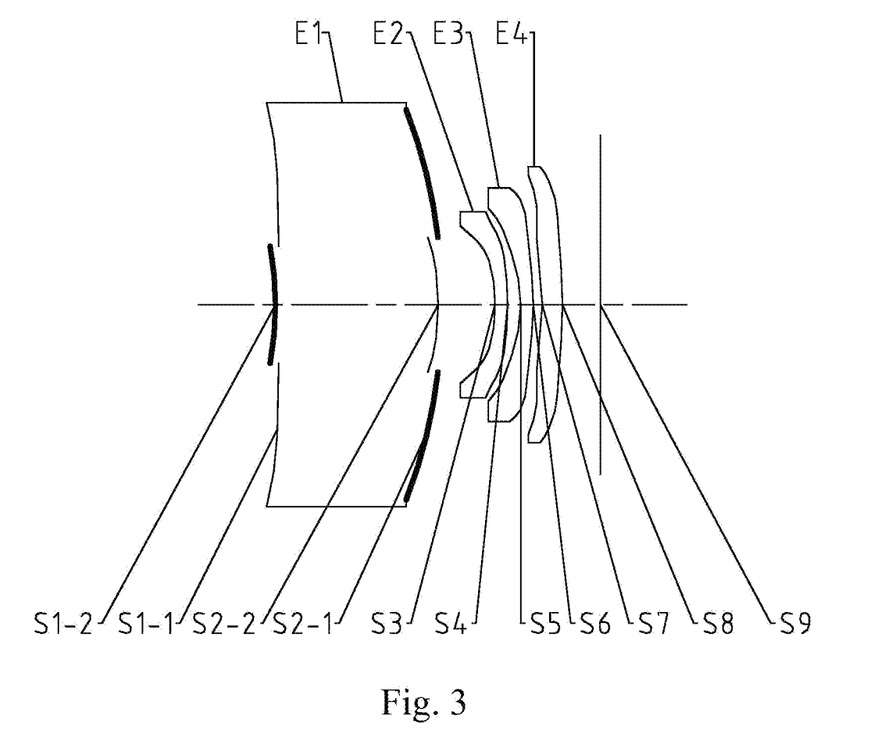
FIG. 3 is a schematic structural diagram illustrating an optical imaging system according to Embodiment 2 of the present disclosure.

FIG. 3 is a schematic structural diagram illustrating an optical imaging system according to Embodiment 2 of the present disclosure. As shown in FIG. 3, the optical imaging system according to Embodiment 2 includes four lenses E1-E4 arranged in sequence from an object side to an image side along an optical axis.

The first lens E1 has a first transmission surface S1-1, a first reflection surface S2-1, a second reflection surface S1-2, and a second transmission surface S2-2. The first transmission surface S1-1 is disposed on an outer circumference of an object-side surface of the first lens E1. The first reflection surface S2-1 is disposed on an outer circumference of an image-side surface of the first lens E1. The second reflection surface S1-2 is disposed at a paraxial region of the object-side surface of the first lens E1. The second transmission surface S2-2 is disposed at a paraxial region of the image-side surface of the first lens E1.

The second lens E2 has an object-side surface S3 and an image-side surface S4.

The third lens E3 has an object-side surface S5 and an image-side surface S6.

The fourth lens E4 has an object-side surface S7 and an image-side surface S8.

In this embodiment, the first lens E1 has a positive refractive power; the second lens E2 has a negative refractive power; the third lens E3 has a positive refractive power; and the fourth lens E4 has a positive refractive power.

In the optical imaging system of the present embodiment, a diaphragm STO disposed between the object side and the first lens for limiting the light beam is further included.

The optical imaging system according to Embodiment 2 may include an optical filter and/or a protective lens. The optical filter may be used to correct the color deviation, and the protective lens may be used to protect an image sensing chip located on an image plane S9. Light from an object sequentially passes through the surfaces S1-1 to S8 and finally forms an image on the image plane S9.

Table 4 below shows the surface type, the radius of curvature, the thickness, the material and the conic coefficient of each lens of the optical imaging system in Embodiment 2. Table 5 shows the high-order coefficients of the aspheric surfaces in Embodiment 2. Table 6 shows the effective focal lengths f1-f4 of the lenses in Embodiment 2, the total effective focal length f of the optical imaging system, and the distance TTL from the second reflection surface S1-2 of the first lens E1 to the image plane S9 of the optical imaging system on the optical axis. Here, the surface types of the aspheric surfaces may be defined by the formula (1) given in the above Embodiment 1.

TABLE 4

| surface number | surface type | radius of curvature | thickness | material refractive index | abbe number | conic coefficient |
|---|---|---|---|---|---|---|
| OBJ | spherical | infinite | infinite | | | |
| S1-1 | aspheric | 154.5917 | 2.5900 | 1.55 | 56.1 | 0.0000 |
| S2-1 | aspheric | −9.0432 | −2.6400 | 1.55 | 56.1 | 0.0000 |
| S1-2(STO) | aspheric | −5.0805 | 2.5800 | 1.55 | 56.1 | 0.0000 |
| S2-2 | aspheric | −4.2569 | 0.8997 | | | 0.0000 |
| S3 | aspheric | −3.2943 | 0.2000 | 1.67 | 20.4 | 0.0000 |
| S4 | aspheric | −4.7218 | 0.2070 | | | 0.0000 |
| S5 | aspheric | −2.1731 | 0.2000 | 1.55 | 56.1 | 0.0000 |
| S6 | aspheric | −4.4726 | 0.1421 | | | 0.0000 |
| S7 | aspheric | −2.7623 | 0.3211 | 1.67 | 20.4 | 0.0000 |
| S8 | aspheric | −7.6609 | 0.6000 | | | 0.0000 |
| S9 | spherical | infinite | | | | |

TABLE 5

| surface number | A4 | A6 | A8 | A10 | A12 |
|---|---|---|---|---|---|
| S1-1 | −1.9106E−03 | −9.6821E−06 | −2.2089E−06 | 3.1080E−07 | −1.6480E−08 |
| S2-1 | −2.0943E−04 | −2.9870E−07 | −5.2761E−07 | 7.1542E−08 | −4.1085E−09 |
| S1-2 | 6.3603E−04 | 8.1934E−05 | −5.8915E−04 | 6.3889E−04 | −3.2690E−04 |
| S2-2 | −1.4829E−02 | −1.9779E−03 | −7.1592E−03 | 5.1963E−03 | −1.0752E−03 |
| S3 | −3.7027E−03 | −1.8061E−01 | 9.0947E−02 | −2.9976E−02 | 7.3773E−03 |
| S4 | 8.7841E−02 | −1.7206E−01 | 9.9011E−02 | −2.5596E−02 | −4.4724E−04 |
| S5 | 2.8521E−02 | −1.1667E−02 | 4.0860E−02 | −2.0646E−02 | −0.002572939 |
| S6 | 3.2298E−02 | 1.0234E−02 | −1.1354E−02 | 4.5629E−03 | −1.4281E−03 |
| S7 | 1.2891E−01 | −2.4055E−02 | −4.7629E−03 | 2.8772E−03 | −5.7995E−04 |
| S8 | 3.1980E−03 | 1.1799E−02 | −3.1383E−03 | −2.0481E−04 | −4.9930E−05 |

| surface number | A14 | A16 | A18 | A20 |
|---|---|---|---|---|
| S1-1 | 0 | 0 | 0 | 0 |
| S2-1 | 0 | 0 | 0 | 0 |
| S1-2 | 0 | 0 | 0 | 0 |
| S2-2 | 0 | 0 | 0 | 0 |
| S3 | −1.5082E−02 | 1.3993E−02 | 2.2143E−03 | −2.8525E−03 |
| S4 | −1.6136E−04 | 6.5320E−04 | 3.9894E−04 | −1.7084E−04 |
| S5 | 8.8480E−04 | 2.3226E−03 | −1.3244E−03 | 2.2660E−04 |
| S6 | 1.8154E−04 | 7.0852E−06 | −3.6446E−06 | 2.7410E−07 |
| S7 | 5.2111E−06 | 1.4063E−05 | 8.9201E−07 | −4.3014E−07 |
| S8 | 1.8381E−05 | 4.3380E−06 | 1.0762E−07 | −1.6338E−07 |

TABLE 6

| f1(mm) | 7.86 | f(mm) | 11.02 |
|---|---|---|---|
| f2(mm) | −17.32 | TTL(mm) | 5.10 |
| f3(mm) | 3.65 | | |
| f4(mm) | 4.33 | | |

Figure 4A:
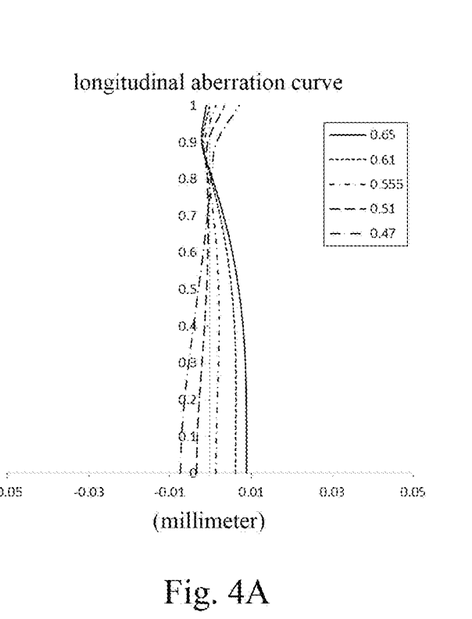
FIG. 4A illustrates a longitudinal aberration curve of the optical imaging system according to Embodiment 2.
Figure 4B:
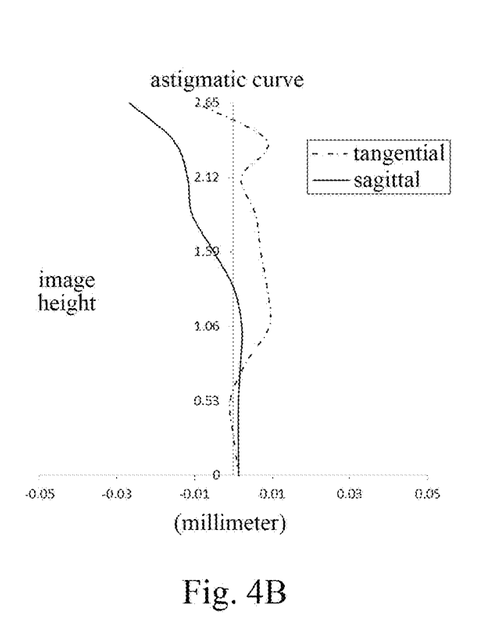
FIG. 4B illustrates an astigmatic curve of the optical imaging system according to Embodiment 2.
Figure 4C:
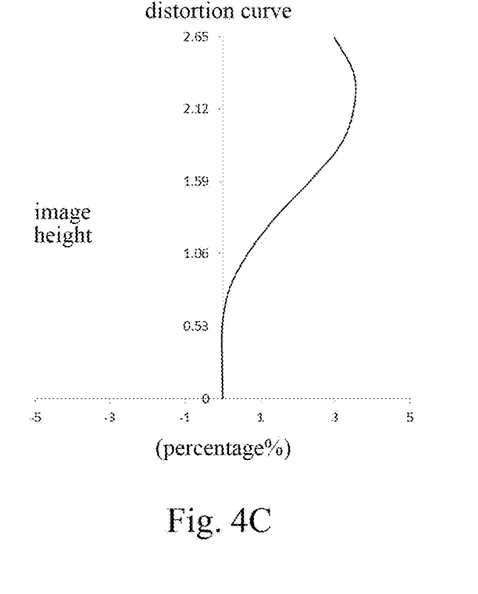
FIG. 4C illustrates a distortion curve of the optical imaging system according to Embodiment 2.

FIG. 4A illustrates the longitudinal aberration curve of the optical imaging system according to Embodiment 2, representing deviations of the focal points of the light of different wavelengths converged after passing through the optical imaging system. FIG. 4B illustrates the astigmatic curve of the optical imaging system according to Embodiment 2, representing a curvature of the tangential image plane and a curvature of the sagittal image plane. FIG. 4C illustrates the distortion curve of the optical imaging system according to Embodiment 2, representing amounts of distortion at different viewing angles. It can be seen from FIGS. 4A-4C that the optical imaging system according to Embodiment 2 can achieve a good imaging quality.

Embodiment 3

An optical imaging system according to Embodiment 3 of the present disclosure is described below with reference to FIGS. 5-6C.

Figure 5:
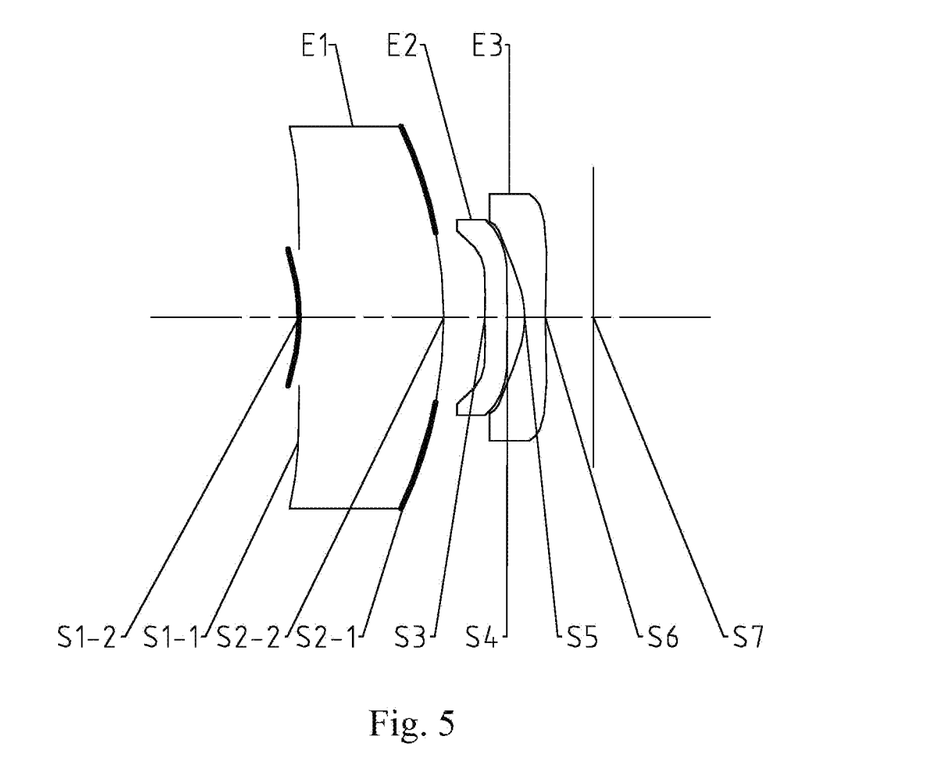
FIG. 5 is a schematic structural diagram illustrating an optical imaging system according to Embodiment 3 of the present disclosure.

FIG. 5 is a schematic structural diagram illustrating an optical imaging system according to Embodiment 3 of the present disclosure. As shown in FIG. 5, the optical imaging system according to Embodiment 3 includes three lenses E1-E3 arranged in sequence from an object side to an image side along an optical axis.

The first lens E1 has a first transmission surface S1-1, a first reflection surface S2-1, a second reflection surface S1-2, and a second transmission surface S2-2. The first transmission surface S1-1 is disposed on an outer circumference of an object-side surface of the first lens E1. The first reflection surface S2-1 is disposed on an outer circumference of an image-side surface of the first lens E1. The second reflection surface S1-2 is disposed at a paraxial region of the object-side surface of the first lens E1. The second transmission surface S2-2 is disposed at a paraxial region of the image-side surface of the first lens E1.

The second lens E2 has an object-side surface S3 and an image-side surface S4.

The third lens E3 has an object-side surface S5 and an image-side surface S6.

In this embodiment, the first lens E1 has a positive refractive power; the second lens E2 has a positive refractive power; and the third lens E3 has a negative refractive power.

In the optical imaging system of the present embodiment, a diaphragm STO disposed between the object side and the first lens for limiting the light beam is further included.

The optical imaging system according to Embodiment 3 may include an optical filter and/or a protective lens. The optical filter may be used to correct the color deviation, and the protective lens may be used to protect an image sensing chip located on an image plane S7. Light from an object sequentially passes through the surfaces S1-1 to S6 and finally forms an image on the image plane S7.

Table 7 below shows the surface type, the radius of curvature, the thickness, the material and the conic coefficient of each lens of the optical imaging system in Embodiment 3. Table 8 shows the high-order coefficients of the aspheric surfaces in Embodiment 3. Table 9 shows the effective focal lengths f1-f3 of the lenses in Embodiment 3, the total effective focal length f of the optical imaging system, and the distance TTL from the second reflection surface S1-2 of the first lens E1 to the image plane S7 of the optical imaging system on the optical axis. Here, the surface types of the aspheric surfaces may be defined by the formula (1) given in the above Embodiment 1.

TABLE 7

| surface number | surface type | radius of curvature | thickness | material refractive index | abbe number | conic coefficient |
|---|---|---|---|---|---|---|
| OBJ | spherical | infinite | infinite | | | |
| S1-1 | aspheric | 57.0948 | 2.2924 | 1.55 | 56.1 | 0.0000 |
| S2-1 | aspheric | −7.2778 | −2.2898 | 1.55 | 56.1 | 0.0000 |
| S1-2(STO) | aspheric | −3.2498 | 2.2924 | 1.55 | 56.1 | 0.0000 |
| S2-2 | aspheric | −7.2778 | 0.6514 | | | 0.0000 |
| S3 | aspheric | 16.3553 | 0.3541 | 1.67 | 20.4 | 0.0000 |
| S4 | aspheric | −23.8833 | 0.2757 | | | 0.0000 |
| S5 | aspheric | −1.5590 | 0.3273 | 1.55 | 56.1 | 0.0000 |
| S6 | aspheric | 5.2585 | 0.7621 | | | 0.0000 |
| S7 | spherical | infinite | | | | |

TABLE 8

| surface number | A4 | A6 | A8 | A10 | A12 |
|---|---|---|---|---|---|
| S1-1 | −2.7582E−03 | 3.1256E−05 | −1.1534E−05 | 1.3722E−06 | −4.6616E−08 |
| S2-1 | −1.6954E−04 | 1.8984E−07 | −5.6398E−07 | 1.1748E−07 | −4.5044E−09 |
| S1-2 | 6.4156E−03 | 1.8150E−03 | −1.1857E−03 | 7.1212E−04 | −1.0254E−04 |
| S2-2 | −1.6954E−04 | 1.8984E−07 | −5.6398E−07 | 1.1748E−07 | −4.5044E−09 |
| S3 | 4.7363E−03 | −2.1622E−01 | 1.8664E−01 | −1.2229E−01 | 3.3098E−02 |
| S4 | 1.4152E−01 | −3.1109E−01 | 2.1960E−01 | −7.4154E−02 | 9.4715E−03 |
| S5 | 1.4577E−01 | −1.7231E−01 | 1.9800E−01 | −8.7079E−02 | 0.013828127 |
| S6 | −1.5028E−01 | 1.1142E−01 | −4.7876E−02 | 1.0685E−02 | −1.0120E−03 |

TABLE 9

| f1(mm) | 9.09 | f(mm) | 12.00 |
|---|---|---|---|
| f2(mm) | 14.62 | TTL(mm) | 4.67 |
| f3(mm) | −2.17 | | |

Figure 6A:
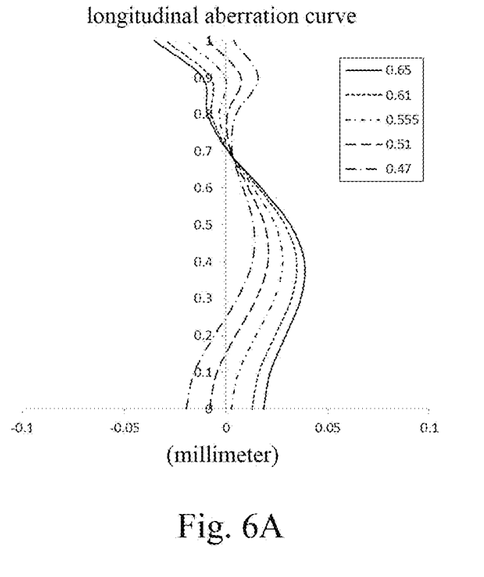
FIG. 6A illustrates a longitudinal aberration curve of the optical imaging system according to Embodiment 3.
Figure 6B:
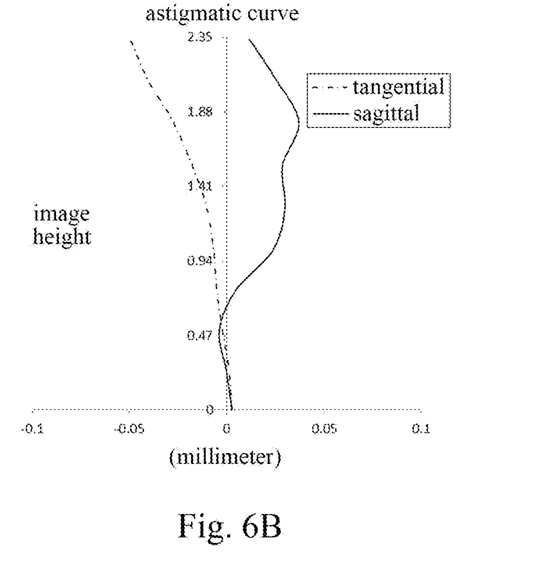
FIG. 6B illustrates an astigmatic curve of the optical imaging system according to Embodiment 3.
Figure 6C:
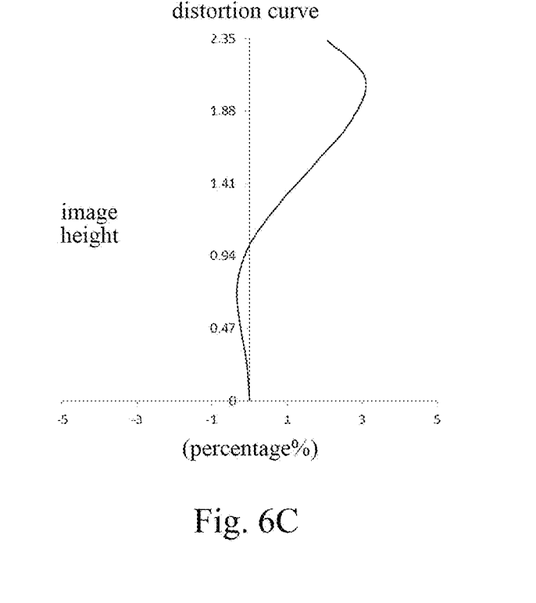
FIG. 6C illustrates a distortion curve of the optical imaging system according to Embodiment 3.

FIG. 6A illustrates the longitudinal aberration curve of the optical imaging system according to Embodiment 3, representing deviations of the focal points of the light of different wavelengths converged after passing through the optical imaging system. FIG. 6B illustrates the astigmatic curve of the optical imaging system according to Embodiment 3, representing a curvature of the tangential image plane and a curvature of the sagittal image plane. FIG. 6C illustrates the distortion curve of the optical imaging system according to Embodiment 3, representing amounts of distortion at different viewing angles. It can be seen from FIGS. 6A-6C that the optical imaging system according to Embodiment 3 can achieve a good imaging quality.

To sum up, Embodiments 1-3 respectively satisfy the relationships shown in Table 10 below.

TABLE 10

| | embodiment | | |
|---|---|---|---|
| conditional expression | 1 | 2 | 3 |
| TTL/f | 0.44 | 0.46 | 0.39 |
| DT1(mm) | 2.77 | 3.19 | 3.00 |
| DT1/ImgH | 1.01 | 1.20 | 1.29 |
| f/EPD | 2.30 | 2.60 | 2.19 |
| BFL/TTL | 0.18 | 0.12 | 0.16 |
| DT2/DT1 | 0.48 | 0.33 | 0.44 |

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, such as technical solutions formed by replacing the features as disclosed in the present disclosure with (but not limited to) technical features with similar functions.

What is claimed is:

1. An optical imaging system comprising sequentially, from an object side to an image side along an optical axis, a first lens, a second lens, and at least one subsequent lens, wherein the first lens has:
    a first transmission surface, disposed on an outer circumference of an object-side surface of the first lens;
    a first reflection surface, disposed on an outer circumference of an image-side surface of the first lens;
    a second reflection surface, disposed at a paraxial region of the object-side surface of the first lens; and
    a second transmission surface, disposed at a paraxial region of the image-side surface of the first lens,
    a maximum effective radius DT1 of the first lens and half of a diagonal length ImgH of an effective pixel area on an image plane of the optical imaging system satisfy: DT1/ImgH<2.0.

2. The optical imaging system according to claim 1, wherein the maximum effective radius DT1 of the first lens satisfies: DT1<4.5 mm.

3. The optical imaging system according to claim 1, wherein an effective focal length f of the optical imaging system and an entrance pupil diameter EPD of the optical imaging system satisfy: f/EPD<2.8.

4. The optical imaging system according to claim 1, wherein the maximum effective radius DT1 of the first lens and a maximum effective radius DT2 of the second transmission surface of the first lens satisfy: 0<DT2/DT1≤0.5.

5. The optical imaging system according to claim 1, satisfying: 0.1<BFL/TTL<0.2,
    wherein BFL is a distance from an image-side surface of a lens closest to the image side of the optical imaging system to the image plane of the optical imaging system on the optical axis; and
    TTL is a distance from a center of the object-side surface of the first lens of the optical imaging system to the image plane of the optical imaging system on the optical axis.

6. The optical imaging system according to claim 5, wherein the distance TTL from the center of the object-side surface of the first lens of the optical imaging system to the image plane of the optical imaging system on the optical axis and an effective focal length f of the optical imaging system satisfy: TTL/f≤0.6.

7. The optical imaging system according to claim 1 wherein the first reflection surface and the second reflection surface have a total reflection effect.

* * * * *